May 24, 1927.
G. O. WILSON
TANK GAUGING DEVICE
Filed Nov. 10, 1924
1,629,758
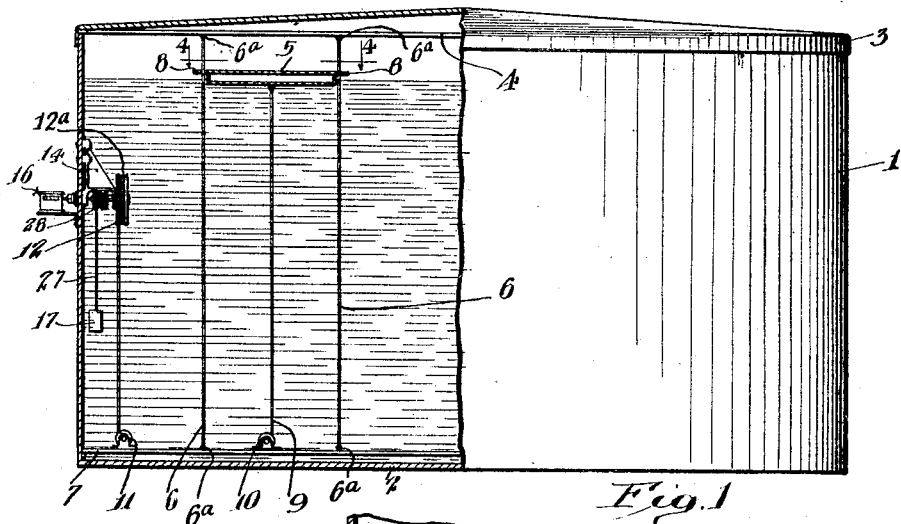
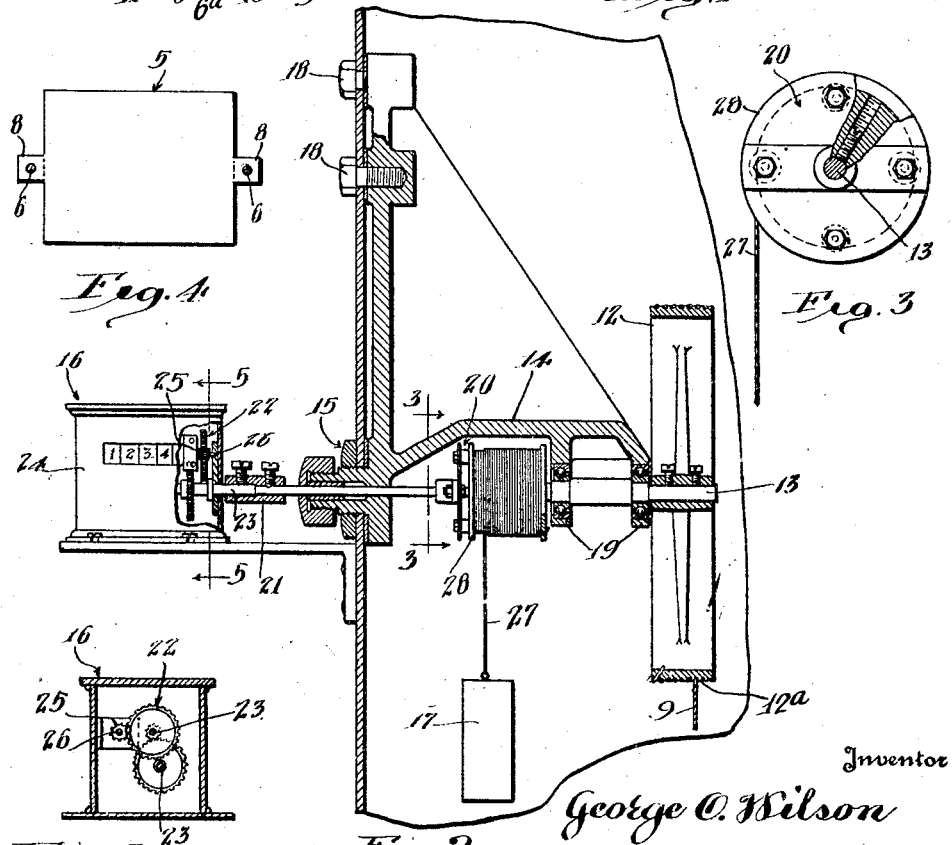
Inventor
George O. Wilson
By Lyon & Lyon
Attorneys Patented May 24, 1927.

1,629,758

UNITED STATES PATENT OFFICE.

GEORGE O. WILSON, OF SAN FRANCISCO, CALIFORNIA, ASSIGNOR, BY MESNE ASSIGNMENTS, TO STANDARD OIL COMPANY OF CALIFORNIA, OF SAN FRANCISCO, CALIFORNIA, A CORPORATION OF DELAWARE.

TANK-GAUGING DEVICE.

Application filed November 10, 1924. Serial No. 748,825.

This invention relates to a tank gauging device and is more particularly directed to an apparatus for measuring the liquid height or volumetric contents of a tank by means of a float connected to a suitable register positioned at any convenient point on the exterior of the tank.

The usual method of determining the volume of oil in a tank has been to drop a weighted tape, through a hatch in the roof, to the bottom of the tank and then read the tape at the mark left by the oil. Having thus found the height in feet and inches, it is necessary to use tables to convert the reading into the units desired to express the contents of the tank, in terms of volume, gallons, barrels, etc. This method involves considerable time and depends to a certain extent on the skill of the operator. But it has become particularly objectionable in view of the recent development of gas-tight tanks. This type of tank reduces evaporation materially and gives added fire protection; involving a gas-tight roof, it makes the hatch for gauging an undesirable feature.

An object of this invention is, therefore, to devise a mechanism or gauging apparatus which will indicate from the ground, by means of a registering device, the tank contents directly in gallons, barrels, or other desired units.

An object of this invention is to provide means for indicating the volume of liquid in a tank or oil container having a gas-tight tank roof.

An object of this invention is to provide means for indicating the volume of liquid in a tank or oil container, such as a float for determining the position of the liquid surface and a mechanism for translating the motion of the float to an indicating device located outside the container and an adjusting mechanism to coordinate the reading of the indicator with the position of the float.

Other objects and advantages of this invention will be apparent from the following detailed description of the preferred embodiment thereof as illustrated in the drawings.

In the drawings:

Figure 1 is a fragmental sectional side elevation of a tank illustrating an embodiment of this invention for use in measuring the contents thereof.

Figure 2 is a fragmental side elevation of the tank and registering device embodied in this invention.

Figure 3 is a fragmental sectional end elevation of the cable winding mechanism, embodied in this invention, taken substantially on the line 3—3 of Figure 2.

Figure 4 is a plan view of the float embodied in this invention, taken substantially on the line 4—4 of Figure 1.

Figure 5 is a sectional end elevation of the register embodied in this invention, taken substantially on the line 5—5 of Figure 2.

In the drawings, 1 indicates a tank formed of a cylindrical shell having a bottom 2 and preferably a gas-tight tank roof 3, containing liquid which it is desired to gauge. A float 5, adapted to ride on the surface of the liquid, is guided by means of cables 6, which cables 6 are spaced apart and secured at their upper ends to the roof or a strap 4, and at their lower ends to the member 7 which member 7 may be part of the floor or some other suitable means connected to the tank. The cables 6 are secured to and stretched between eyes $6^a$ which are secured to the strap 4 and floor 7 in any desirable or preferred manner. The cables 6 pass through ears 8 of the float 5. The float 5 is connected to a movable cable 9 which passes through guide pulleys 10 and 11 and winds upon a grooved drum 12, which is rigidly connected to a shaft 13 supported by a bracket 14 inside of the tank 1 containing the liquid. The motion of the float 5 being transmitted to the drum 12 turns shaft 13 which passes through a stuffing box 15 to the outside of the tank or container and is connected to a registering device 16 which indicates the height of the liquid in the tank and by means of a suitable proportioning of the various parts, may be made to indicate the quantity of liquid in the tank. The pull of the float 5 is resisted by a weight 17 connected to a cable 27 winding on a drum 28 which drum 28 is mounted on the shaft 13, and which serves to keep a uniform tension on the cable 9 at all times and to rewind the said cable on the drum 12 when the liquid level in the tank 1 sinks. The drum 12 is helically grooved as indicated at $12^a$ to guide the cable 9 during the winding or unwinding of the cable of the drum so that the cable 9 will under all conditions of operation be wound upon the drum 12 without danger of the same tangling up on the drum 12, the helical groove 12ᵃ acting as a guide for the cable 9.

Means are provided for supporting shaft 13 with drums 12 and 28 preferably as follows:

The bracket 14 may be made of any suitable metal, such as cast iron or brass, and is secured to the side or shell of the tank 1 by means of cap screws 18, or other suitable means, and may be integral with the stuffing box 15. The bracket 14 supports the shaft 13 in two bearings 19, illustrated in the drawings as ball bearings, but which may be any other low friction bearing. The shaft 13 is reduced in cross section where it passes through the stuffing box 15 in order that the friction may be reduced to a minimum.

One or more flexible couplings 20 may be introduced to guard against sticking due to imperfect alignment of the various bearings. Connected to the end of the shaft 13 on the outside of the tank 1 by means of a suitable coupling member 21, is a registering device 16, which preferably consists of a train of gears 22 supported on suitable shafts 23 and 23′ in an appropriate housing 24, which train of gears 22 is coupled to the shaft 13 by means of any suitable coupling device 21 as previously described. The last gear 25 of the train of gears 22 is mounted on the shaft 26 of a counting device of the "star and pin" or Veeder type, or other suitable indicating mechanism.

The diameter of the winding drum 12, together with the ratio of the gear train 22 determines the significance of the reading on the register 16 and they are adjusted to cause the register 16 to indicate the correct liquid level in the container in any desired unit of measure.

Such a gauging device as heretofore described, may be applied to a gas-tight container and will produce accurate readings since the only motion translated through the stuffing box 15 is the rotary motion of the small diameter shaft 13. Where the float cable 9 is brought to the outside of the tank it is found impossible to make an ordinary stuffing box tight without imposing excessive friction which causes the gauge to read inaccurately. Moreover, the reading of the gauge as indicated on the register 16 is direct and independent of the observer, since the quantity or height of the liquid in the container is indicated in a straight row of plain figures and the reading requires no manipulation on the part of the observer. All the movable parts inside of the tank are frequently or continuously immersed in oil and so are lubricated and protected from corrosion. Also the only opening in the tank is normally below the oil level where leakage may be immediately detected, whereas if the opening were in the gas space, considerable leakage might take place without detection. The tank is filled with oil through any suitable connection that may be connected to the tank at any point desired as is well understood in the art.

It is frequently the case where oil is stored in containers that a layer of water exists in the bottom of the container, the oil resting on the top of the water. It may also be true that some other liquid material heavier than the oil might accumulate or be present in the bottom of the tank. In order to ascertain the true volume of oil in cases of this sort it is necessary to determine the depth of the water or other liquid material that may exist below the oil; or to know where the dividing surface is between the oil and such heavier liquid. By the methods of tank gauging heretofore practiced it is sometimes difficult to determine where this dividing surface exists; and consequent attending difficulty is met in determining the volume of oil to be measured. By the use of a float having a density such that it will ride at the dividing surface between the oil and any heavier liquid material which may exist in the bottom of the tank, it will be apparent that the invention which I have described herein can be used to accurately determine the volume of oil that may rest thereon. It will be obvious from the foregoing description that as the float 5 rises or falls on the surface of the liquid within the tank that the registering device 16 will be actuated to indicate the position of the float within the tank, the regulating device being so connected with the float 5 that the same will indicate directly the quantity of liquid within the tank.

Oil is often stored in a tank over water and the provision of a float of a density calculated so that the said float will ride upon or substantially at the dividing surface between the oil and water within the tank enables me to register or indicate the quantity or volume of water within the tank, and knowing the quantity of water and oil in the tank, I am enabled to directly and easily determine the volume of oil in the tank. The making of a float of such a density that the same will ride upon the surface of the water or the dividing line between the surface of the oil and the water may be easily done by determining the gravity of the oil within the tank, and knowing the gravity of water within the tank, the density of the float may be made such that the same will ride upon the surface of the water in the tank but will sink through the oil within the tank.

It will also be apparent that my invention is particularly well adapted for use where a tank may have a roof which floats on the surface of the contained liquid and which, therefore, rises and falls as the volume of liquid varies within the tank or container. Such a roof is sometimes employed on oil storage tanks. In such event I may use the floating roof in lieu of the float illustrated in the accompanying drawings and the functioning of the floating roof, when connected as hereinabove described to an indicating device, will be apparent.

Having fully described the preferred embodiment of this invention, it is to be understood that it is not intended to limit the scope of the invention to the exact construction, or the use herein set forth, which may obviously be varied within the spirit of the appended claims.

I claim:

1. In a sealed tank, a liquid gauge comprising a float, means for guiding the movement of the float, a drum located within the tank below the normal liquid surface, flexible means for connecting the drum to the float, said latter means being so arranged as to permit the float to descend below the drum, means for holding said connecting means in tension, a shaft, and a registering device located outside of the tank and connected to the drum by means of the shaft, a stuffing box through which the shaft extends, said shaft being adapted to transmit rotary motion only.

2. A liquid gauge comprising a float mounted within a container, means for guiding the float vertically, a drum having a helical peripheral guide groove, means for supporting the drum at a point within the container below the normal liquid level in the said container, a cable adapted to be wound on the said drum in the helical peripheral guide groove, the said cable being secured to the said float, a shaft to which the said drum is secured, means secured to the said shaft for maintaining the said cable under uniform tension, a registering device located outside of the said container, means for connecting the said shaft with the said register, and a stuffing box through which the said shaft extends from the said container.

Signed at San Francisco, California, this 30th day of October, 1924.

GEORGE O. WILSON.